US006691083B1

(12) United States Patent
Breen

(10) Patent No.: US 6,691,083 B1
(45) Date of Patent: Feb. 10, 2004

(54) WIDEBAND SPEECH SYNTHESIS FROM A NARROWBAND SPEECH SIGNAL

(75) Inventor: Andrew Paul Breen, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,319

(22) PCT Filed: Mar. 17, 1999

(86) PCT No.: PCT/GB99/00819

§ 371 (c)(1), (2), (4) Date: Aug. 31, 2000

(87) PCT Pub. No.: WO99/49454

PCT Pub. Date: Sep. 30, 1999

(30) Foreign Application Priority Data

Mar. 25, 1998 (EP) .............................................. 9830228

(51) Int. Cl.[7] ........................ G01L 19/04; G01L 19/08; G01L 19/10

(52) U.S. Cl. ....................... 704/220; 704/223; 704/222; 704/219; 704/264; 704/258; 704/268; 704/229

(58) Field of Search ................................ 704/223, 219, 704/222, 200.1, 230, 207, 208, 220, 229, 216, 217, 264, 258, 268

(56) References Cited

U.S. PATENT DOCUMENTS

| | | | | | |
|---|---|---|---|---|---|
| 4,283,601 | A | * | 8/1981 | Nakajima et al. | 704/233 |
| 5,001,758 | A | * | 3/1991 | Galand et al. | 704/212 |
| 5,293,449 | A | * | 3/1994 | Tzeng | 704/223 |
| 5,327,518 | A | * | 7/1994 | George et al. | 704/211 |
| 5,361,278 | A | * | 11/1994 | Vaupel et al. | 375/240 |
| 5,504,833 | A | * | 4/1996 | George et al. | 704/211 |
| 5,581,652 | A | * | 12/1996 | Abe et al. | 704/222 |
| 5,933,808 | A | * | 8/1999 | Kang et al. | 704/278 |
| 5,950,153 | A | * | 9/1999 | Ohmori et al. | 704/217 |
| 5,987,407 | A | * | 11/1999 | Wu et al. | 704/200.1 |
| RE36,478 | E | * | 12/1999 | McAulay et al. | 704/206 |
| 6,041,297 | A | * | 3/2000 | Goldberg | 704/219 |
| 6,289,311 | B1 | * | 9/2001 | Omori et al. | 704/268 |
| 6,311,154 | B1 | * | 10/2001 | Gersho et al. | 704/219 |

FOREIGN PATENT DOCUMENTS

| | | | |
|---|---|---|---|
| EP | 0336658 | | 10/1989 |
| JP | 6-118995 | | 4/1994 |
| JP | 7-56599 | A | 3/1995 |

OTHER PUBLICATIONS

Carl et al., ("Speech coding using nonstationary sinusoidal modeling and narrow–band basis functions", 1991 International Conference on Acoustics, speech, and Signal Processing, 1991, vol. 1, pp. 581–584).*

Chan et al., ("Wideband enhancement of narrowband coded speech using MBE re–synthesis", 3rd International Conference on Signal Processing 1996, vol. 1, pp. 667–670).*

Epps et al., ("A new technique for wideband enhancement of coded narrowband speech", 1999 IEEE workshop, Speech Codin Proceedings, pp. 174–176).*

Valin et al., ("Bandwidth extension of narrowband speech for low bit–rate wideband coding", Proceedings, 2000 IEEE Worksho on Speech Coding, 2000 , pp. 130–132).*

Abe et al, "More Natural Sounding Voice Quality Over the Telephone", NTT Review, vol. 7, No. 3, May 1995.

* cited by examiner

*Primary Examiner*—Vijay Chawan
(74) *Attorney, Agent, or Firm*—Nixon & Vanderhye P.C.

(57) ABSTRACT

Wideband speech is synthesized from a bandlimited speech signal, for example from speech which has been transmitted via the public switched telephone network. Due to the nature of the vocal tract, there is a correlation between a bandlimited signal and those parts of an original wideband speech signal which are missing from that signal. Narrowband speech is characterized in terms of estimated formant frequencies provided by a peak picker. The frequency of formants in speech give a good indication, for voiced sounds, as to the shape of the vocal tract. The set of frequencies provided by the peak picker is used to access a codebook which provides synthesis parameters for use by a synthesizer.

14 Claims, 6 Drawing Sheets

WIDEBAND SPEECH SYNTHESIS FROM A NARROWBAND SPEECH SIGNAL

BACKGROUND OF RELATED ART

1. Field of the Invention

This invention relates to speech synthesis, in particular to the synthesis of wideband speech from a bandlimited speech signal, for example from a speech signal which has been transmitted via the public switched telephone network.

This invention is based on the observation that due to the nature of the vocal tract, there is a correlation between those parts of an original wideband speech signal which are missing from a bandlimited version of that signal and the bandlimited version of that signal. Due to this correlation, speech from within the bandwidth of a bandlimited speech signal can be used to predict the missing original wideband speech signal. The correlation is better for voiced sounds than for unvoiced sounds.

2. Description of Related Art

Known systems for constructing a wideband speech signal from a telephone bandwidth speech signal use a training process to define a transformation whereby an estimate of the missing signal can be generated from a narrowband input signal. In general, a lookup table is constructed during a training phase which defines a correspondence between a representation of a narrowband signal and a representation of the required wideband signal. The lookup table can be used for performing a translation from an actual narrowband spectrum to an estimated wideband spectrum. To generate a wideband speech signal from a narrowband speech signal, received narrowband speech is analysed and the closest representation in the lookup table is identified. The corresponding wideband signal representation is used to synthesise the required wideband signal. The whole of the wideband signal may be synthesised, or the original narrowband signal may be added to a synthesised version of the signal outside the bandwidth of the narrowband signal.

Abe and Yoshida, 'Method for reconstructing a wideband speech signal', Japanese patent application no 6-118995, construct such a lookup table using linear predictive coding (LPC) analysis to characterise the spectrum of wideband training speech. LPC coefficients are extracted from wideband training signals. These wideband LPC coefficients are clustered to form wideband codewords. The wideband training signal is then band-pass filtered to provide a bandlimited signal, the spectrum of which is also characterised using LPC analysis. The narrowband LPC coefficients thus obtained are paired with the corresponding wideband codeword, and for each wideband codeword the set of corresponding narrowband coefficients are averaged to form a narrowband codeword. Thus the narrowband signal and the wideband signal are both represented by a set of LPC coefficients. Synthesis of the wideband signal from the LPC coefficients is performed using conventional techniques. In an alternative system (Abe and Yoshida, 'Method for reconstructing a wideband speech signal', Japanese patent application no 7-56599) the wideband signal is represented by speech waveforms, and synthesis of the wideband signal is achieved by concatenation of speech waveforms.

BRIEF SUMMARY OF THE INVENTION

According to one exemplary aspect of the present invention, an apparatus for synthesising speech from a bandlimited speech signal comprises: means for extracting a spectral signal from the bandlimited signal; peak-picking means arranged to receive said spectral signal and to search a predetermined frequency range to provide a set of one or more peak frequency output values corresponding to the frequency of one or more peaks in said spectral signal; codebook means containing a plurality of codebook entries each codebook entry comprising a set of one or more codebook frequency values and a set of one or more corresponding synthesis parameters; look-up means arranged to receive said peak frequency value set and arranged to access the codebook means to extract a required synthesis parameter set corresponding to a codebook frequency value set which is close to said peak frequency value set; and speech synthesis means arranged to receive the required synthesis parameter set and to generate speech using said required synthesis parameter set.

The codebook synthesis parameter set may contain a synthesis parameter relating to the amplitude of a peak in the spectrum of the synthesised speech, the frequency of the peak being outside the predetermined frequency range.

The codebook synthesis parameter set may contain a synthesis parameter which relates to the frequency of a peak in the spectrum of the synthesised speech, the frequency of the peak being outside the predetermined frequency range.

In a preferred embodiment the peak picking means is capable of recognising more than one peak in said spectral signal and in such an event to provide a set containing a plurality of peak frequency output values, and in which some of the codebook frequency value sets contains a plurality of codebook frequency values.

In a possible embodiment of the present invention a codebook synthesis parameter set contains three synthesis parameters each relating to the amplitude of a high frequency peak in the spectrum of the synthesised speech, the frequency of the high frequency peaks being a higher frequency than the upper band limit of the predetermined frequency range.

In another embodiment of the present invention, codebook synthesis parameter set contains a synthesis parameter relating to the frequency of a low (frequency peak in the spectrum of the synthesised speech, the frequency of the low frequency peak being a lower frequency than the lower band limit of the predetermined frequency range; and a synthesis parameter relating to the amplitude of low frequency peak.

Additionally a pitch extracting means may be connected to receive the bandlimited speech signal and in the event that the spectral signal represents voiced speech to provide a pitch frequency value corresponding to the pitch of the received bandlimited speech signal. Some of the codebook frequency value sets contain a frequency value relating to pitch. In the event that the spectral signal represents voiced speech, the lookup means may be arranged to extract a required synthesis parameter set corresponding to a codebook frequency value set which is also close to said pitch frequency value.

Corresponding methods are also provided by this invention.

In the present invention a peak picker 2 is used to provide estimates of formant frequencies. Due to the nature of the vocal tract constraints due to the shape of the vocal and nasal cavities and constraints due to the physical limitations of the muscles mean that the frequency of formants give a good indication, for voiced sounds, as to the shape of the vocal tract. Hence, for voiced sounds, formants within the known narrowband speech signal are a good indicator of the position of any formants outside the bandwidth of the narrowband speech signal.

BRIEF DESCRIPTION OF THE DRAWINGS

Examples of the invention will now be described, by way of example only, with reference to the accompanying drawings in which.

DETAILED DESCRIPTION OF EXEMPLARY EMBODIMENTS OF THE INVENTION

Figure 1:
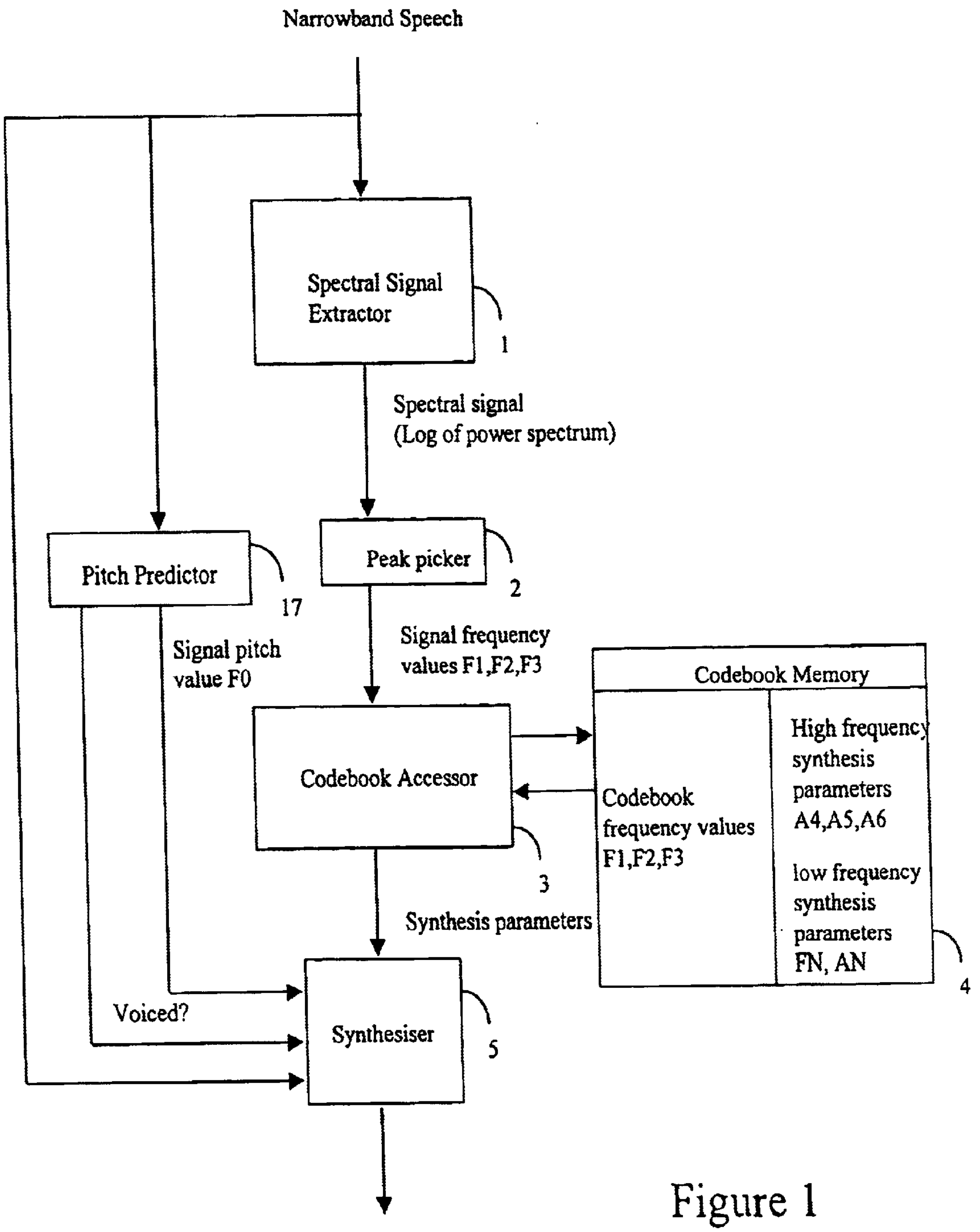
FIG. 1 is a schematic block diagram of an apparatus for synthesising wideband speech from a received narrowband speech signal in which the narrowband signal is characterised in terms of formant frequencies.

Referring to FIG. 1, digital narrowband speech is received by a spectral signal extractor 1, for example, from a digital telephone network, or from a digital to analogue converter. The embodiment of the invention described here is designed to synthesise wideband speech from a telephone bandwidth speech signal, so the received speech is in the bandwidth 300 Hz to 3.4 KHz. Spectral signals, each of which represents a number of contiguous digital samples, are derived from the digital narrowband speech. For example, speech samples may be received at a rate of 8000 samples per second, and a spectral signal may represent a frame of 256 contiguous samples, ie 32 ms of speech. A spectral signal comprises a set of spectral values, each spectral value corresponding to a particular frequency value. Preferably each frame is windowed (ie the samples are multiplied by predetermined weighting constants) using, for example, a Hamming window to reduce spurious artefacts generated by the frame's edges. In a preferred embodiment the frames are overlapping, for example by 50%, so as to provide one frame every 16 ms. In the embodiment of the invention described here, the spectral signals are obtained by means of a Fast Fourier Transform (FFT) performed on each frame thus providing signal values for a range of frequency values then this signal is rectified (ie the magnitude of each value is used) prior to calculating the logarithm of each value. Thus, the spectral signals produced represent the logarithm of the spectrum of the narrowband speech. The spectral signal extractor 1 may be provided by a suitably programmed digital signal processor (DSP).

Each spectral signal is analysed in turn by a peak picker 2 which searches for one or more peaks in the spectral signal and provides as an output the frequency value of those peaks identified. The number of peaks which are searched for will depend on, amongst other things, the bandwidth of the narrowband speech signal received. It will be appreciated that the number of peaks identified may be less than or equal to the number of peaks which are searched for. In the embodiment described here the frequencies (F1, F2 and F3) of three peaks in the spectral signal are searched for. These three peaks are intended to correspond to the first three formants in the speech signal. Peaks may be defined as frequency values which have a higher spectral value than the spectral values of frequency values close to them. A window size may be defined which gives the number of frequency values over which the spectral values are compared. For example, for a window size of three, if the spectral value of a frequency value is greater than the spectral value of the next lower frequency value and greater than the spectral value of the next higher frequency value then it is defined as a peak. For a window size of five, if the spectral value of a frequency value is greater than the spectral value of the two next lower frequency values and greater than the spectral value of the two next higher frequency values then it is defined as a peak. Other window sizes may be used. It is possible to define frequency ranges within which it is expected to find peaks in the spectral signal, and the frequency with the highest spectral value within each range is identified. Peaks outside these ranges may then be disregarded. The peak picker may be implemented using a suitably programmed microprocessor chip or by a DSP chip, which could be the same DSP as is used to implement the spectral signal extractor.

A codebook accessor 3 receives a set of one or more frequency values of peaks in the spectral signal derived from a frame of narrowband speech. A codebook memory 4, which may be implemented using a standard random access memory (RAM) chip, contains sets each set containing one or more frequency values and corresponding sets each set containing one or more synthesiser parameters. A measure, such as the Euclidean distance, is used to determine a set of codebook frequency values is close to the received set. The corresponding set of synthesis parameters is extracted and sent to a speech synthesiser 5. In the embodiment described here, the synthesis parameters used are three amplitude parameters, called A4, A5 and A6 in this description, which define the amplitude of three high frequency synthetic formants centred on the frequencies 4350 Hz, 5400 Hz and 7000 Hz respectively, and a frequency and amplitude pair of parameters, called FN and AN in this description, which define the frequency and amplitude of a synthetic formant with a frequency somewhat below 300 Hz. Such a low frequency formant is usually present in speech due to the resonance of the nasal cavity.

The synthesis parameters used in the embodiment described here have been selected based on knowledge of the attributes of a speech signal which are important perceptually. For example, it has been demonstrated that the human ear is insensitive to the precise frequency of the fourth, fifth and sixth formant, but that the amplitude of those formants are perceptually important. Hence in this embodiment of the invention the frequencies of these formants are fixed, and the amplitude parameters A4, A5 and A6, are selected based on components of the narrowband spectrum.

The synthesiser 5 requires a pitch frequency parameter, F0, which represents the required pitch of the speech waveform. During voiced speech (for example, vowel sounds) the speech signal is modulated by a low frequency signal which depends on the pitch of the speaker's voice, and is relatively characteristic of a given speaker. During unvoiced speech (for example, "sh") there is no such modulation.

The pitch frequency parameter, F0, is generated by a pitch extractor 17. The pitch frequency parameter, F0, may be generated by performing an inverse FFT on the log of the spectrum which is received from the spectral signal extractor 1. Alternatively, as the spectrum is real it is sufficient to perform a discrete cosine transform (DCT) on the spectral signal. Either technique produces a cepstral signal which comprises a set of cepstral values each corresponding to a quefrency value. The pitch of the utterance appears as a peak in the cepstral signal, which can be detected using a peak picking algorithm such as the one described previously. As the cepstral values may be negative, in order to detect a peak in the signal, either the magnitude of the cepstral values are used, or the cepstral values are squared. If there is no cepstral value with a magnitude above a given threshold, then the signal is deemed to be unvoiced, and in addition to a signal indicating the pitch frequency parameter, F0, the pitch detector 17 can provide a binary signal indicating whether the frame of speech to which the cepstral signal corresponds is voiced or unvoiced. When searching for such a peak in the cepstrum it is only necessary to consider cepstral values within the quefrency range which corresponds to a frequency range of normally pitched speech.

Figure 3:
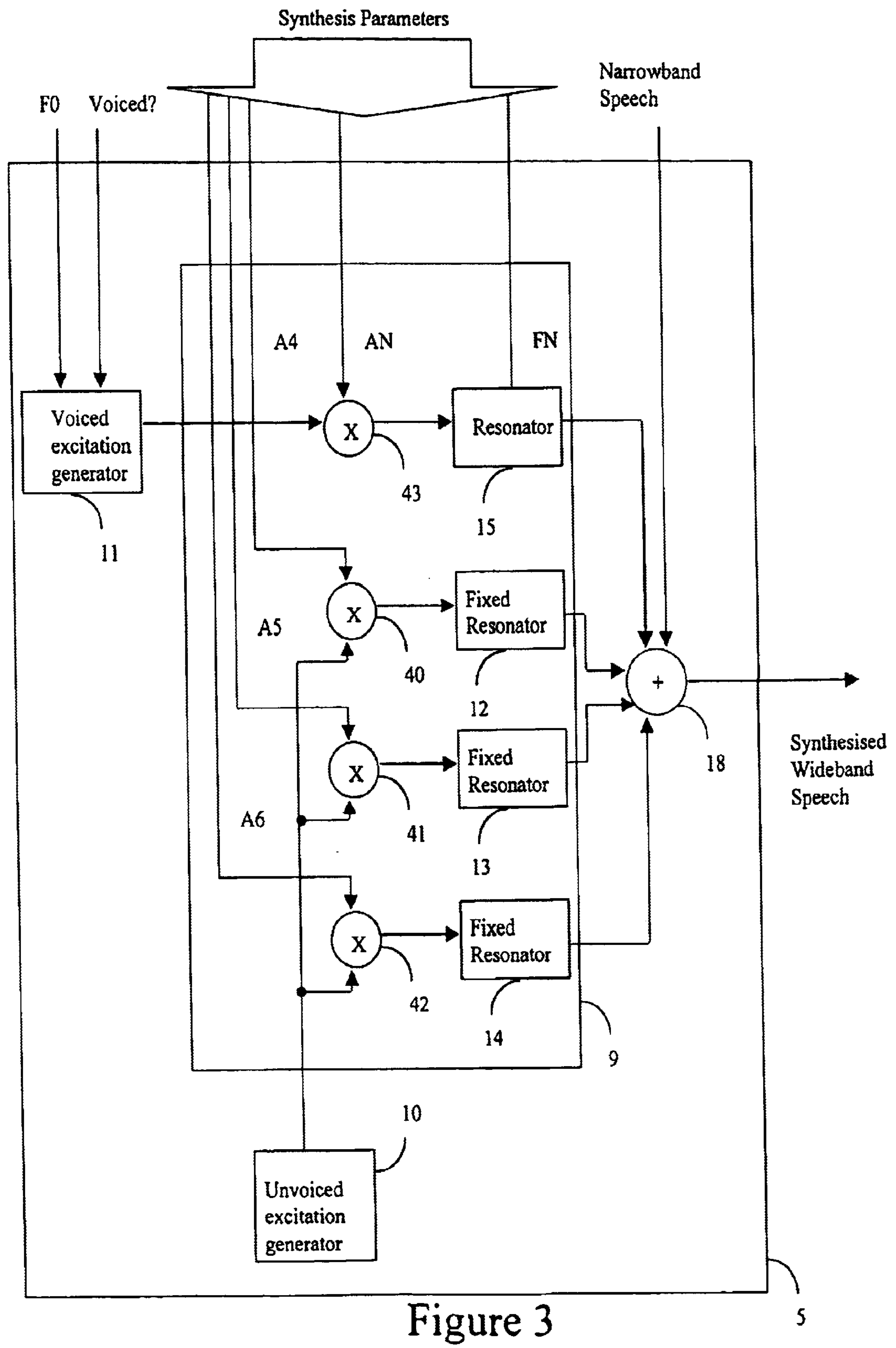
FIG. 3 shows an apparatus suitable for synthesising wideband speech using the present invention.

The operation of the synthesiser 5 is described later with reference to FIG. 3.

Figure 2:
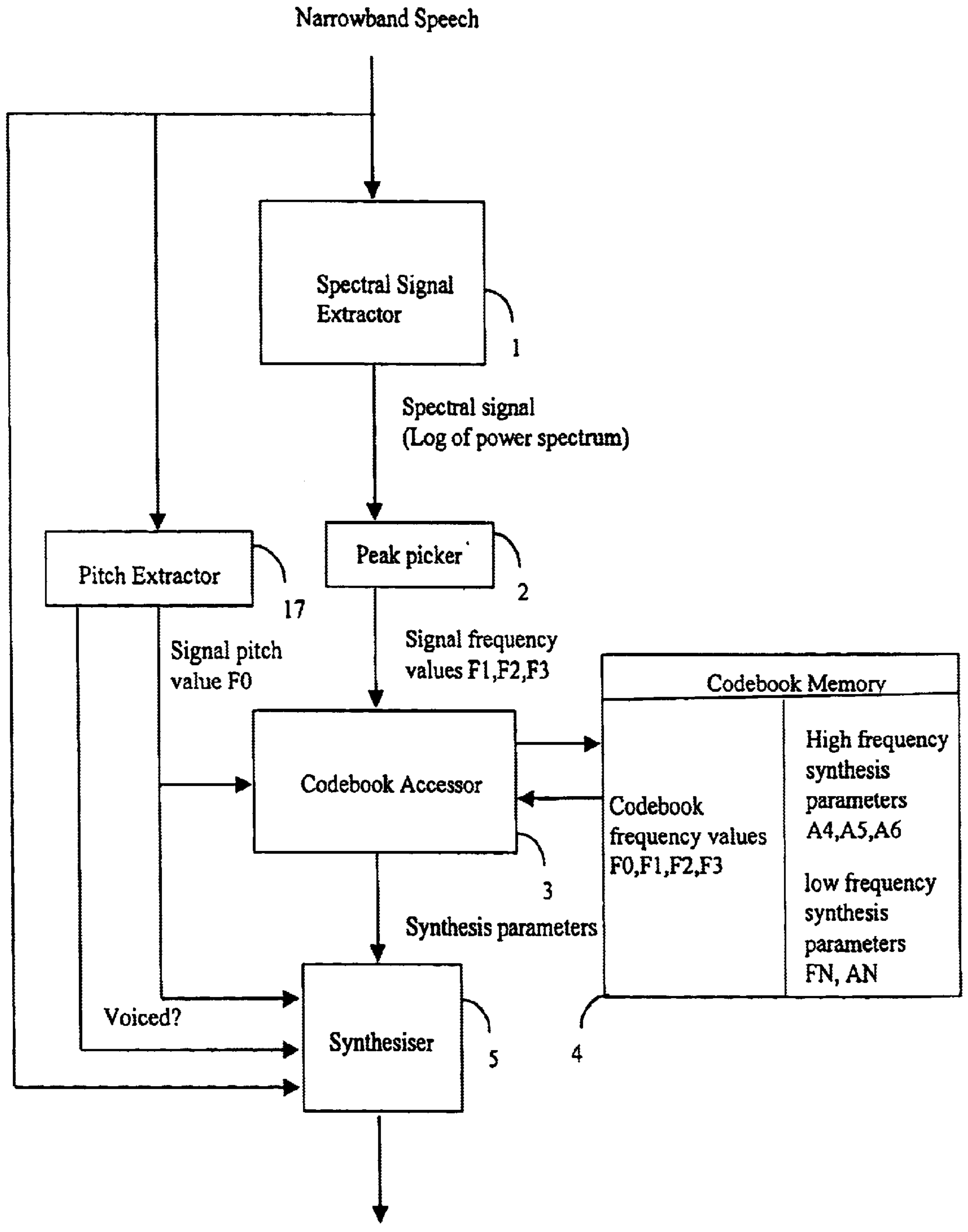
FIG. 2 show another embodiment of an apparatus for synthesising wideband speech from a received narrowband speech signal.

Referring briefly to FIG. 2 which shows a second embodiment of an apparatus for synthesising wideband speech from a received narrowband speech signal. The codebook frequency value set contains frequency values F1, F2, and F3 and additionally the pitch frequency value, F0.

The pitch frequency parameter, F0, is generated by the pitch extractor 17. It is advantageous to include a pitch frequency parameter in the codebook frequency value set because speech utterances with very different pitch frequencies, for example male and female speech, may exhibit different interrelationships between the formants in the bandlimited speech and those outside that bandwidth. Additionally, voiced utterances will exhibit a different relationship between the bandlimited spectrum and the wideband spectrum, to that relationship exhibited by unvoiced utterances.

The operation of the synthesiser 5 of FIG. 1 will now be described with reference to FIG. 3 which shows a synthesis apparatus for synthesising wideband speech using a set of synthesis parameters, such as those provided by the apparatus shown in FIG. 1. The synthesis apparatus 5 of FIG. 3 is based on well known principles of parallel formant synthesis although in this case only frequencies outside those of the bandlimited signal are synthesised. The principles of operation of such a synthesiser are based on a model of speech production in which speech is considered to be the output of a time-varying filter 9 driven by a substantially separable excitation function. The excitation function is generally provided using two excitation sources, an unvoiced excitation generator 10 and a voiced excitation generator 11. The unvoiced excitation generator 10 provides a signal substantially similar to white noise, whilst the voiced excitation generator 11 is controlled by the pitch frequency parameter, F0, which determines the frequency of the waveform provided by the excitation generator. The pitch frequency parameter, F0, is extracted from the narrowband speech signal by the pitch extractor 17 of FIG. 1. The time varying filter 9 is provided by a network of parallel resonators 12, 13, 14, 15.

In a generalised formant speech synthesiser both excitation generators could be connected to all the resonators, with the degree of excitation being controlled by 'voicing control' parameters. However, in conventional formant synthesisers such parameters are usually binary, with each voicing control parameter being set to the alternative value to its counterpart. In the embodiment described here, the voiced excitation generator 11 is controlled by the pitch frequency parameter, F0, which is generated from the narrowband speech by the pitch extractor 17. The voiced excitation generator is connected to a resonator 15, the centre frequency of which is controlled using the codebook synthesis parameter FN. The amplitude of the excitation signal is controlled by the codebook synthesis parameter AN which is multiplied by the excitation signal at the multiplier 43. In this embodiment the bandwidth of the resonator centred on FN is defined to be from ⅚ FN to 1⅙ FN. For example, if FN is 250 Hz, then the 6 dB lower and upper cut-off frequencies will occur at approximately 208 Hz and 292 Hz respectively. The unvoiced excitation generator 10 is connected to resonators 12, 13 and 14 which are used to simulate three high frequency formants centred on 4350 Hz, 5400 Hz and 7000 Hz respectively. The resonator 12 has a bandwidth of 3870 Hz–4820 Hz, and the amplitude of the excitation signal is controlled by the codebook synthesis parameter A4 which is multiplied by the excitation signal at the multiplier 40. The resonator 13 has a bandwidth of 4820 Hz–6020 Hz, and the amplitude of the excitation signal is controlled by the codebook synthesis parameter A5 which is multiplied by the excitation signal at the multiplier 41. The resonator 14 has a bandwidth of 6020 Hz–7940 Hz, and the amplitude of the excitation signal is controlled by the codebook synthesis parameter A6 which is multiplied by the excitation signal at the multiplier 42.

If the narrowband signal is not voiced then no pitch frequency parameter, F0, is generated from the narrowband signal by the pitch predictor 17, and no excitation is supplied to the resonator 15 by the voiced excitation generator 11. However, the resonators 12, 13, 14 are driven by the unvoiced excitation generator 10 whether the narrowband signal is voiced or unvoiced. The signals from the resonators 12, 13, 14 and 15 and the received narrowband speech signal are summed at an adder 18 to provide a synthesised wideband speech signal.

Figure 4:
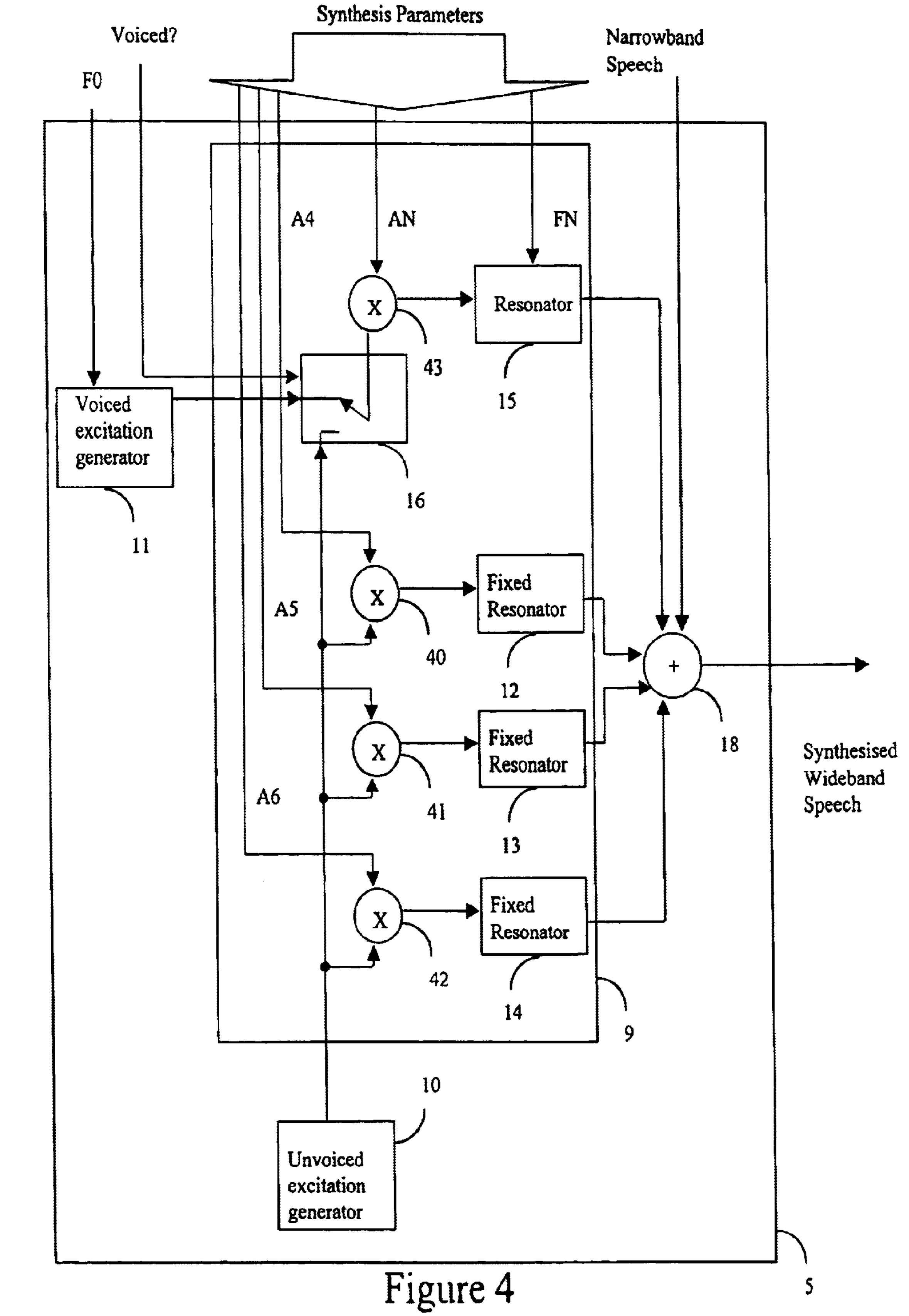
FIG. 4 shows another example of an apparatus suitable for synthesising wideband speech using the present invention.

In another embodiment, shown in FIG. 4, the unvoiced excitation generator 10 is connected to the resonator 15 via a switch 16 which is controlled by the voiced/unvoiced binary signal received from the pitch extractor 17. The excitation supplied to the resonator 15 depends on the value of this second binary signal. The excitation is supplied to the resonator 15 by the voiced excitation generator 11 in the case of voiced narrowband speech and by the unvoiced excitation generator 10 in the case of unvoiced narrowband speech.

Figure 5:
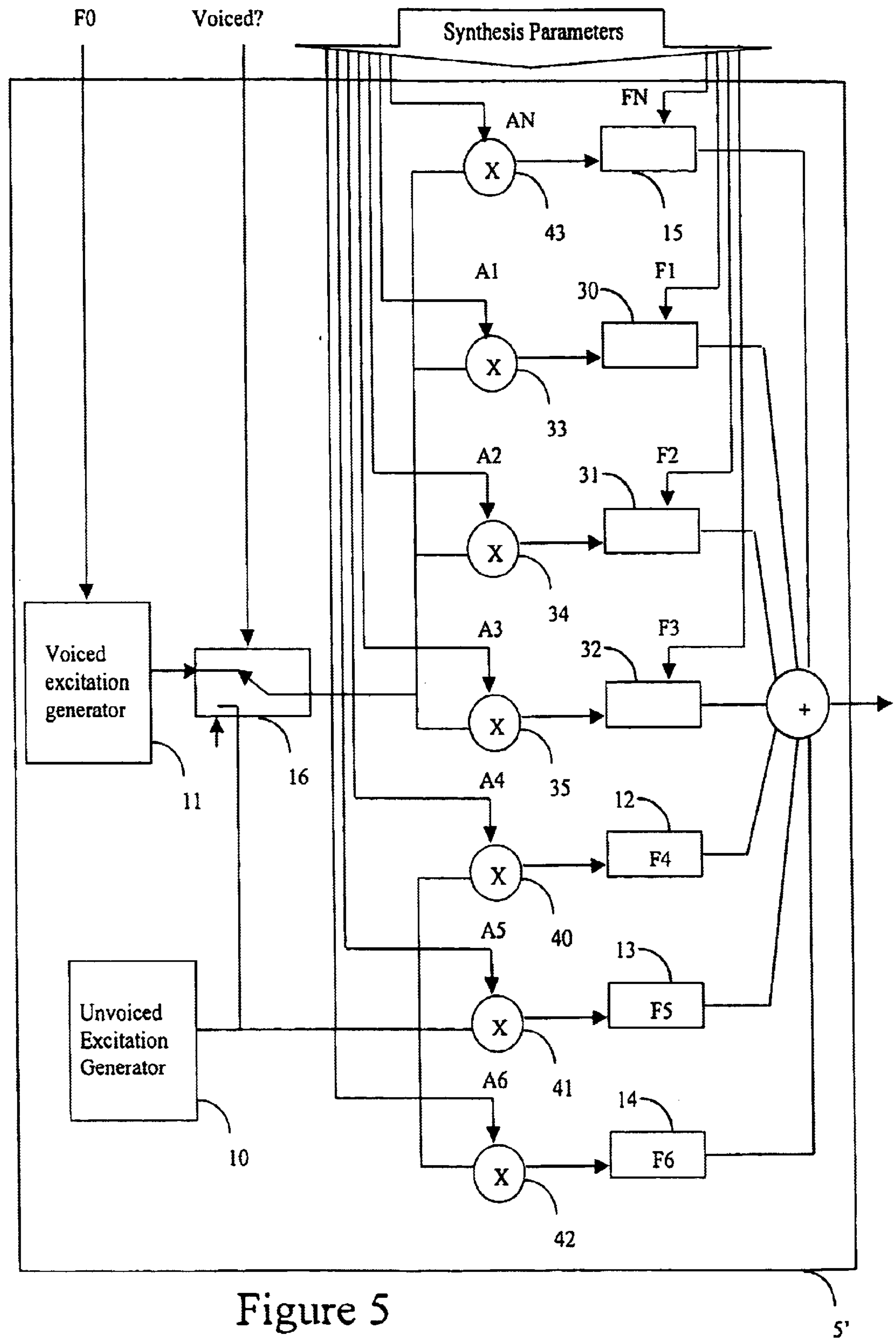
FIG. 5 shows another apparatus suitable for synthesising wideband speech using the present invention.

It will be appreciated that it would be possible to synthesise an entire wideband speech signal using an apparatus such as that shown in FIG. 5 in which the peak picker is modified to provide a modified synthesiser 5' with additional signal frequency values F1, F2 and F3 together with additional signal amplitude values A1, A2 and A3. The frequency signal values would be used to control extra resonators 30, 31 and 32, and the amplitude values would be used to control the amplitude of the voiced excitation signal via multipliers 33, 34 and 35.

An alternative would be to provide the synthesiser 5' with the codebook frequency values of F1, F2, F3 which are considered close to the signal frequency values by the codebook accessor 3. However, amplitude values A1, A2 and A3 would still have to be provided by a modified peak picker.

Figure 6:
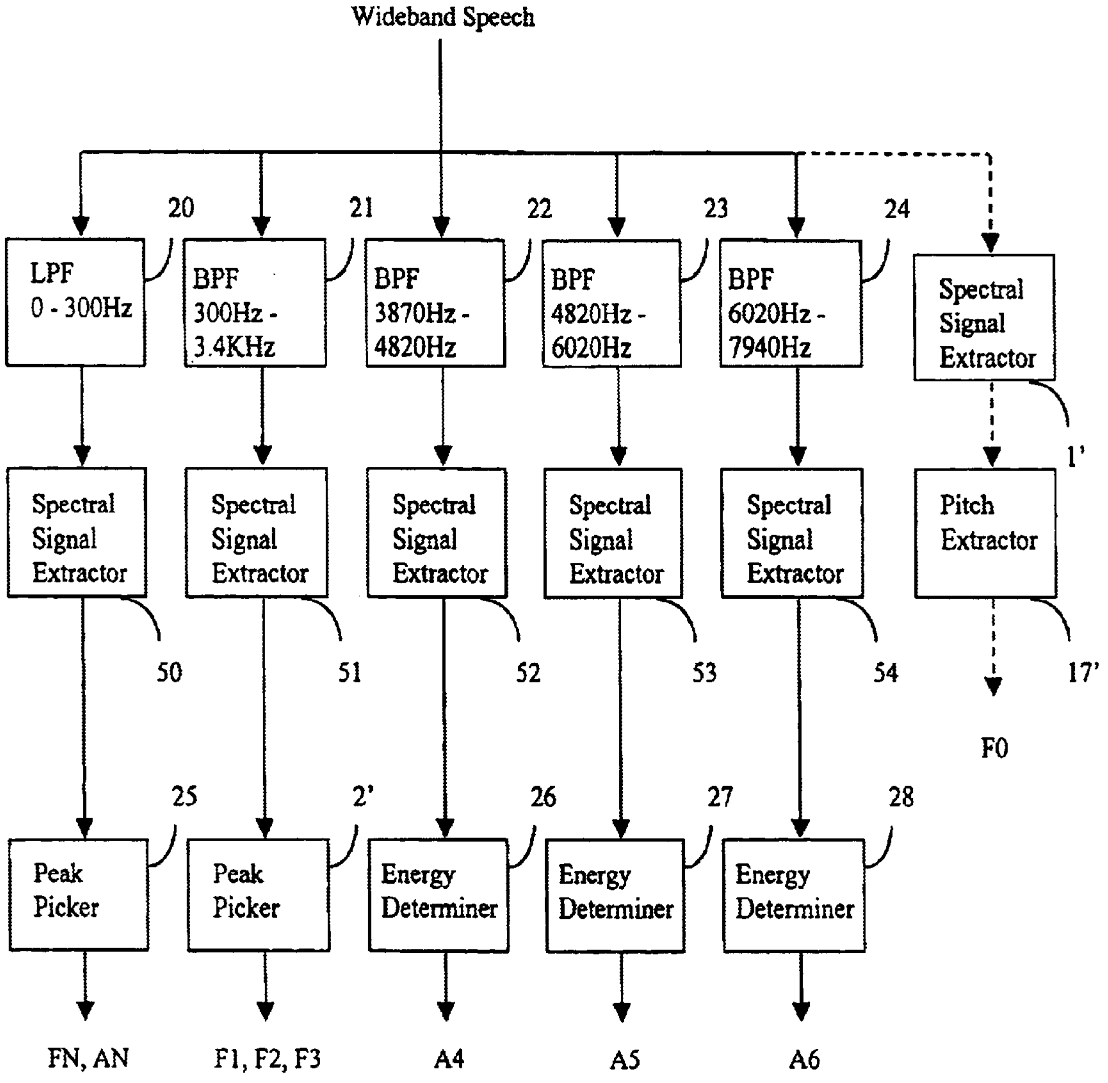
FIG. 6 shows an apparatus for generating a lookup table for use in one embodiment of the present invention.

FIG. 6 shows an apparatus for generating a codebook suitable for use in this invention. Digital wideband speech signals are received by a number of filters 20, 21, 22, 23, 24 which provide bandlimited signals. In the embodiment described here, a low pass filter 20 provides a low frequency spectral signal from 0–300 Hz; a band pass filter 21 provides a narrowband signal analogous to that which will be provided to the synthesis apparatus, in this case 300 Hz to 3.4

KHz; and band pass filters 22, 23 and 24 provide three high frequency spectral signals one for each of the frequency bands to be used for three high frequency formants, in this embodiment, 3870 Hz–4820 Hz, 4820 Hz–6020 Hz, and 6020 Hz–7940 Hz respectively. Each bandlimited spectral signal is analysed by a corresponding spectral signal extractor 50, 51, 52, 53, or 54 using a similar process to that used by the spectral signal extractor 1. A peak picker 2' is attached to receive the narrowband signal, and three codebook frequency values, known herein as F1, F2 and F3 are determined using the peak picking algorithm described previously with reference to FIG. 1. A peak picker 25 is connected to receive the low frequency spectral signal. The peak picker 25 determines the frequency and amplitude, known as FN and AN respectively, of the most prominent peak in the low frequency spectral signal using a similar algorithm to that used by the peak picker 2'. Three energy determiners 26, 27, 28 are used to measure the average amplitude of the three high frequency spectral signals which are provided by the filters 22, 23 and 24 respectively. The three average amplitude values, known herein as A4, A5 and A6, are used to provide estimates of the amplitudes of three high frequency formants. Thus using the apparatus of FIG. 6, for each example of wideband speech, three codebook frequency values F1, F2 and F3 are provided, and five synthesis parameters, FN, AN, A4, A5 and A6 are provided. Of course, it is possible to cluster the codebook entries to provide a smaller codebook of representative examples of parameters. Clustering considerably speeds up the codebook search in the synthesis apparatus of FIG. 1.

As described previously with reference to FIG. 2, in another embodiment of the invention, a codebook frequency value set contains the pitch frequency value, F0. F0 represents the pitch of the wideband speech utterance and may be generated using a pitch extractor 17' which receives a signal from a spectral signal extractor 1' the pitch extractor 17' and the spectral signal extractor 1' operating in a similar manner to the pitch extractor 17 and the spectral signal extractor 1 of FIG. 1.

What is claimed is:

1. An apparatus for synthesising speech from a bandlimited speech signal, the apparatus comprising means for extracting a spectral signal from the bandlimited signal;

peak-picking means arranged to receive said spectral signal and to search a predetermined frequency range to provide a set of one or more peak frequency output values corresponding to the frequency of one or more peaks in said spectral signal;

codebook means containing a plurality of codebook entries, each codebook entry comprising a set of one or more codebook frequency values and a set of one or more corresponding synthesis parameters;

look-up means arranged to receive said peak frequency value set and arranged to access the codebook means to extract a required synthesis parameter set corresponding to a codebook frequency value set which is close to said peak frequency value set; and speech synthesis means arranged to receive the required synthesis parameter set and to generate speech using said required synthesis parameter set.

2. An apparatus according to claim 1 in which the codebook synthesis parameter set contains a synthesis parameter which relates to the amplitude of a peak in the spectrum of the synthesised speech, the frequency of the peak being outside the predetermined frequency range.

3. An apparatus according to claim 1 in which the codebook synthesis parameter set contains a synthesis parameter which relates to the frequency of a peak in the spectrum of the synthesised speech, the frequency of the peak being outside the predetermined frequency range.

4. An apparatus according to claim 1 in which the peak picking means is capable of recognising more than one peak in said spectral signal and in such an event to provide a set containing a plurality of peak frequency output values, and in which some of the codebook frequency value sets contains a plurality of codebook frequency values.

5. An apparatus according to claim 1 in which a codebook synthesis parameter set contains three synthesis parameters each relating to the amplitude of a high frequency peak in the spectrum of the synthesised speech, the frequency of the high frequency peaks being a higher frequency than the upper band limit of the predetermined frequency range.

6. An apparatus according to claim 1 in which a codebook synthesis parameter set contains a synthesis parameter relating to the frequency of a low frequency peak in the spectrum of the synthesised speech the frequency of the low frequency peak being a lower frequency than the lower band limit of the predetermined frequency range; and a synthesis parameter relating to the amplitude of the low frequency peak.

7. An apparatus according to claim 1 further comprising a pitch extracting means connected to receive the bandlimited speech signal and in the event that the spectral signal represents voiced speech to provide a pitch frequency value corresponding to the pitch of the received bandlimited speech signal; in which some of the codebook frequency value sets contain a frequency value relating to pitch; and in the event that the spectral signal represents voiced speech the lookup means is arranged to extract a required synthesis parameter set corresponding to a codebook frequency value set which is also close to said pitch frequency value.

8. A method for synthesising speech from a bandlimited speech signal, the method comprising:

extracting a spectral signal from the bandlimited signal;

searching a predetermined frequency range of the spectral signal to provide a set of one or more peak frequency output values corresponding to the frequency of one or more peaks in said spectral signal;

accessing a codebook containing a plurality of codebook entries, each codebook entry comprising a set of one or more codebook frequency values and a set of one or more corresponding synthesis parameters;

determining a required synthesis parameter set corresponding to a codebook frequency value set which is close to said peak frequency value set; and synthesising speech using said required synthesis parameter set.

9. A method according to claim 8 in which the codebook synthesis parameter set contains a synthesis parameter which relates to the amplitude of a peak in the spectrum of the synthesised speech, the frequency of the peak being outside the predetermined frequency range.

10. A method according to claim 8 in which the codebook synthesis parameter set contains a synthesis parameter which relates to the frequency of a peak in the spectrum of the synthesised speech, the frequency of the peak being outside the predetermined frequency range.

11. A method according to claim 8 in which in the event that more than one peak in said spectral signal is recognised the peak frequency output value set contains a plurality of peak frequency output values, and in which some of the codebook frequency value sets contain a plurality of codebook frequency values.

12. A method according to claim 8 in which the codebook synthesis parameter set contains three synthesis parameters each relating to the amplitude of a high frequency peak in the spectrum of the synthesised speech, the frequency of the high frequency peaks being a higher frequency than the upper band limit of the predetermined frequency range.

13. A method according to claim 8 in which a codebook synthesis parameter set contains a synthesis parameter relating to the frequency of a low frequency peak in the spectrum of the synthesised speech, the frequency of the low frequency peak being a lower frequency than the lower band limit of the predetermined frequency range; and a synthesis parameter relating to the amplitude of the low frequency peak.

14. A method according to claim 8 in which some of the codebook frequency value sets contain a frequency value relating to pitch; and in the event that the spectral signal represents voiced speech a pitch frequency value corresponding to the pitch of the spectral signal is used to determine a required synthesis parameter set corresponding to a codebook frequency value set which is also close to said pitch frequency value.

* * * * *